(12) United States Patent
Cagno et al.

(10) Patent No.: US 7,337,357 B2
(45) Date of Patent: Feb. 26, 2008

(54) APPARATUS, SYSTEM, AND METHOD FOR LIMITING FAILURES IN REDUNDANT SIGNALS

(75) Inventors: Brian James Cagno, Tucson, AZ (US); John Charles Elliott, Tucson, AZ (US); Carl Evan Jones, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 10/989,656

(22) Filed: Nov. 16, 2004

(65) Prior Publication Data

US 2006/0112305 A1 May 25, 2006

(51) Int. Cl.
*G06F 11/00* (2006.01)
(52) U.S. Cl. .......................................................... 714/14
(58) Field of Classification Search ................. 714/14, 714/22
See application file for complete search history.

(56) References Cited

U.S. PATENT DOCUMENTS

| | | | | |
|---|---|---|---|---|
| 4,438,431 A | * | 3/1984 | Toyomura | 340/663 |
| 4,812,677 A | * | 3/1989 | Perry | 326/14 |
| 4,817,091 A | | 3/1989 | Katzman et al. | 371/9 |
| 4,997,288 A | | 3/1991 | Rosenow | 380/2 |
| 5,367,697 A | * | 11/1994 | Barlow et al. | 713/330 |
| 5,488,731 A | | 1/1996 | Mendelsohn | 395/800 |
| 5,623,596 A | * | 4/1997 | Townsley et al. | 714/14 |
| 5,708,771 A | * | 1/1998 | Brant et al. | 714/22 |
| 5,745,670 A | * | 4/1998 | Linde | 714/22 |
| 5,790,773 A | | 8/1998 | DeKoning et al. | 395/182.04 |
| 5,835,780 A | * | 11/1998 | Osaki et al. | 713/300 |
| 5,925,139 A | * | 7/1999 | Yamada et al. | 714/14 |
| 5,928,368 A | | 7/1999 | Jardine et al. | 714/22 |
| 6,088,816 A | | 7/2000 | Nouri et al. | 714/31 |
| 6,140,926 A | | 10/2000 | Hayden et al. | 340/635 |
| 6,145,098 A | | 11/2000 | Nouri et al. | 714/31 |
| 6,163,849 A | | 12/2000 | Nouri et al. | 713/324 |
| 6,195,754 B1 | | 2/2001 | Jardine et al. | 713/324 |
| 6,345,369 B1 | * | 2/2002 | Kitamorn et al. | 714/14 |
| 6,594,786 B1 | | 7/2003 | Connelly et al. | 714/50 |
| 6,600,238 B1 | | 7/2003 | Emberty et al. | 307/85 |
| 6,691,248 B1 | * | 2/2004 | Nishijima et al. | 714/14 |
| 6,813,634 B1 | | 11/2004 | Ahmed | 709/224 |
| 7,152,175 B2 | * | 12/2006 | Madany et al. | 713/340 |
| 7,219,258 B2 | * | 5/2007 | LeVangia et al. | 714/14 |

* cited by examiner

*Primary Examiner*—Robert Beausoliel
*Assistant Examiner*—Amine Riad
(74) *Attorney, Agent, or Firm*—Kunzler & McKenzie

(57) ABSTRACT

An apparatus, system, and method are disclosed for limiting failures in redundant signals. A coordination module generates a power status signal for each of a plurality of power modules. An input module receives a source signal. A signal generation module generates a plurality of output signals from the source signal and at least one power status signal. The output signals are not asserted if at least one power supply is operational. If a device of the signal generation module malfunctions, no more than one output signal is erroneously asserted.

30 Claims, 6 Drawing Sheets

APPARATUS, SYSTEM, AND METHOD FOR LIMITING FAILURES IN REDUNDANT SIGNALS

BACKGROUND OF THE INVENTION

1. Field of the Invention

This invention relates to redundant signals and more particularly relates to limiting failures resulting from single device malfunctions in redundant signals.

2. Description of the Related Art

The costs of losing data and mitigating data losses can be high for a critical system such as an enterprise computer system, a redundant array of independent disks ("RAID") system, and a transaction processing system. To reduce the potential for data loss, critical systems often employ a warning signal to notify a component such as a computer, a hard disk drive, a router, or the like of a state change that may affect the component's function. The warning signal forewarns the component so that the component may take timely action to prevent data loss.

For example, certain RAID systems generate a warning signal of an imminent power failure such as an early power off warning ("EPOW") signal. A hard disk drive may receive the warning signal and in response to the signal complete writes of data from a volatile write buffer to the non-volatile hard disk and go off-line in advance of the power failure. Completing the writes prior to the power failure protects the data in the write buffer from loss. In addition, going off-line protects the hard disk drive from damage or data loss when power is unavailable.

Unfortunately, if a component receives an erroneous warning signal generated as a result of the failure of a device generating the warning signal, the component may take an action in response to the erroneous warning that adversely affects the critical system. For example, conventional RAID system hard disk drives upon receiving an erroneous warning of a power failure go off-line, reducing the redundancy of the RAID system and increasing the risk of data loss.

Critical systems typically employ a plurality of redundant components to protect against data loss if one of the components fails. For example, if a single hard disk drive of a RAID system fails or becomes unavailable, the RAID system generally does not lose data because other hard disk drives contain redundant data from the failed hard disk drive. Critical systems also often include redundant warning signals to limit the consequences of erroneous warning signals. For example, certain RAID systems generate a distinct warning signal for each hard disk drive. Thus a first erroneous warning signal generated for a first hard disk drive does not cause a second hard disk drive to take an adverse action because the second hard disk drive expects a distinct second warning signal.

Unfortunately, one or more devices such as arrays of semiconductor gates or discrete electronic devices are often common to the generation of the plurality of redundant warning signals. For example, the plurality of warning signals may all be generated from the output of a common AND logic gate configured to perform a logical AND operation. If one of the common devices generating the redundant warning signals such as the common logic AND gate fails, the plurality of signals may be erroneous. As a result, a plurality of components may respond by going off-line or the like. If the number of components responding to the erroneous signal exceeds the redundancy of the critical system, the system's data may be at risk.

For example, if two or more RAID system hard disk drives receive erroneous warning signals indicating an imminent power failure as a result of the failure of a common device, each hard disk drive may write buffer data to the hard disk and go off-line. The hard disk drives going off-line may put all of the data of the RAID system at risk by removing the RAID system's access to redundant data stored on the off-line hard disk drives or the system's ability to write redundant data to the hard disk drives. Thus, an erroneous warning signal may put system data at risk by eliminating the redundancy of the RAID system.

From the foregoing discussion, it should be apparent that a need exists for an apparatus, system, and method that limit failures in generating redundant signals. Beneficially, such an apparatus, system, and method would limit the effects of device malfunctions on the generation of redundant signals.

SUMMARY OF THE INVENTION

The present invention has been developed in response to the present state of the art, and in particular, in response to the problems and needs in the art that have not yet been fully solved by currently available redundant signal generation methods. Accordingly, the present invention has been developed to provide an apparatus, system, and method for generating redundant signals that overcome many or all of the above-discussed shortcomings in the art.

The apparatus to generate redundant signals is provided with a logic unit containing a plurality of modules configured to functionally execute the necessary steps of generating a power status signal, receiving a source signal, and generating output signals. These modules in the described embodiments include a coordination module, an input module, and a signal generation module.

The coordination module generates a power status signal for each of a plurality of power modules. The power modules supply power to one or more system components. The power status signal for a power module may be asserted if the power module is supplying power. In one embodiment, each power module includes a coordination module, an input module, and a signal generation module.

The input module receives a source signal. The source signal indicates a subsequent state change for one or more conditions such as the availability of power on a power grid. For example, the source signal may indicate an imminent power failure. In one embodiment, the source signal precedes the state change by a specified time interval. For example, the source signal may indicate the power failure will occur within five milliseconds (5 ms).

The signal generation module generates a plurality of output signals from the source signal and at least one power status signal. In one embodiment, the output signals are EPOW signals. The output signals are not asserted if at least one power supply is operational. A single malfunction of a signal generation module device results in the failure of no more than one output signal. In one embodiment, the signal generation module, the input module, and the coordination module are fabricated from a plurality of discrete, redundant solid-state electronic devices. The apparatus limits the malfunction of a single device to the failure of a single output signal.

A system of the present invention is also presented to generate redundant signals. The system may be embodied in a critical system such as a RAID system. In particular, the system, in one embodiment, includes a plurality of storage devices, a controller module, a plurality of power modules, an input module, a coordination module, and a signal generation module.

The storage devices store and retrieve data. In one embodiment, the storage devices are hard disk drives of a RAID system. The controller module controls the storage devices. The power modules supply power to the storage devices. In one embodiment, the power modules convert alternating current ("AC") power from a power grid to direct current ("DC") power, supplying the DC power to the storage devices. In a certain embodiment, the storage devices are sufficiently powered if at least one power module supplies power.

The coordination module generates a power status signal for each of a plurality of power modules. The input module receives a source signal and the signal generation module generates a plurality of output signals from the source signal and at least one power status signal. In one embodiment, the system further comprises one or more EPOW modules. Each EPOW module may receive the output signal and generate one or more EPOW signals from the output signal. In one embodiment, the EPOW signals conform to a specification for Fibre Channel EPOW signals.

In a certain embodiment, the system includes a test module. The test module may be configured to generate output signals in response to the assertion of one or more control signals. In addition, the test module may generate other signals for testing the functionality of the system.

In one embodiment, the system comprises a plurality of input modules, a plurality of coordination modules, and a plurality of signal generation modules. The plurality of input modules, coordination modules, and signal generation modules may be powered by a supplemental power module. The supplemental power module may power the plurality of input modules, coordination modules, and signal generation modules when each power module does not supply power.

A method of the present invention is also presented for generating redundant signals. The method in the disclosed embodiments substantially includes the steps necessary to carry out the functions presented above with respect to the operation of the described apparatus and system. In one embodiment, the method includes generating a power status signal, receiving a source signal, and generating a plurality of output signals.

A coordination module generates a power status signal for each of a plurality of power modules. An input module receives a source signal. A signal generation module generates a plurality of output signals from the source signal and at least one power status signal. In one embodiment, a battery signal module generates a battery signal. The battery signal may direct a battery backup module to supply power. In addition, a controller signal module may generate a controller signal indicating an imminent state change such as a state change of one or more storage devices to a controller module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention reduces failures in a critical system by generating redundant output signals. In addition, the present invention limits the effects of output signal failures resulting from signal generation device malfunctions. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
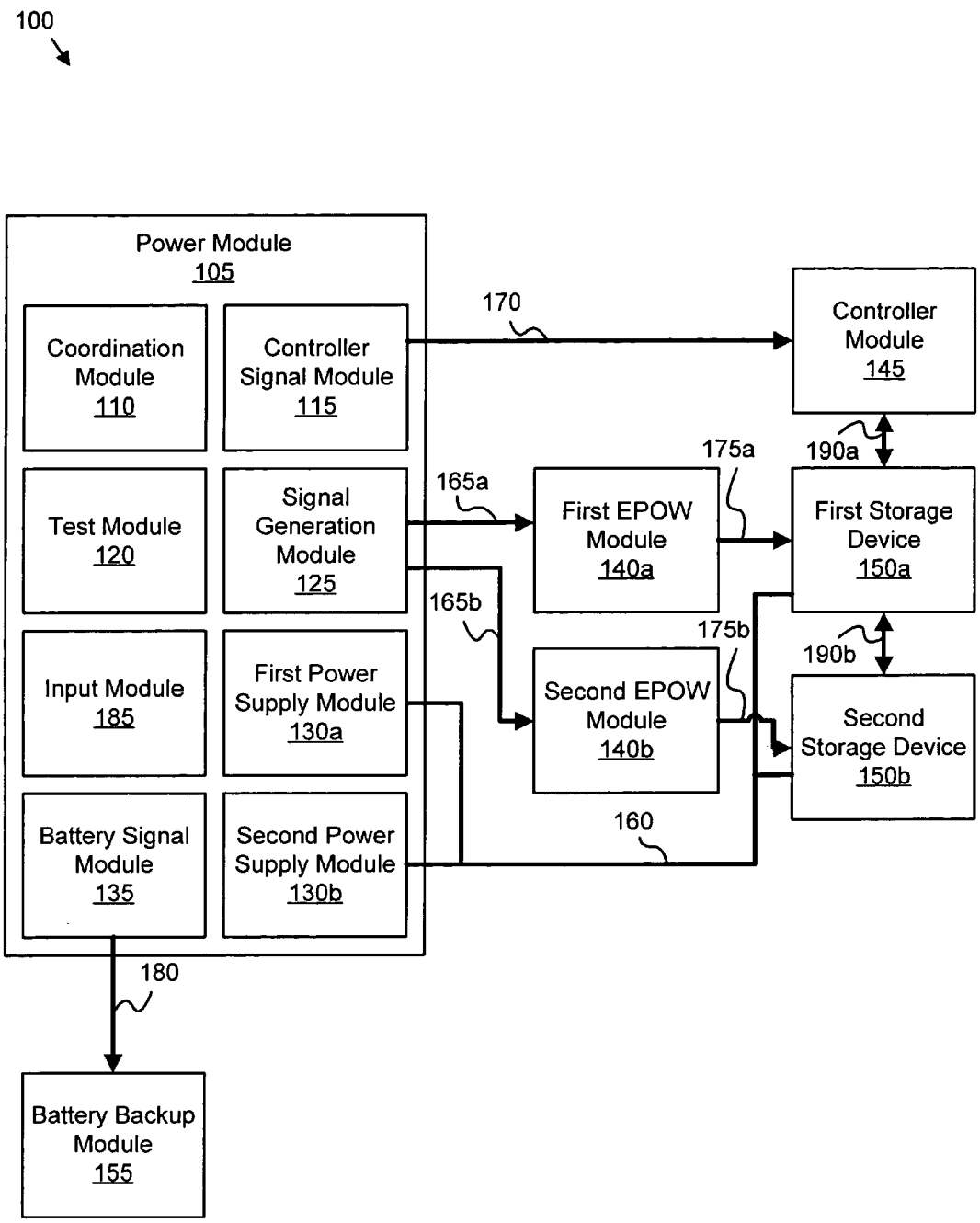
FIG. 1 is a schematic block diagram illustrating one embodiment of a redundant signal generation system in accordance with the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a redundant signal generation system 100 of the present invention. The system 100 includes a plurality of storage devices 150a, 150b, a controller module 145, and a power module 105 having therein a plurality of power supply modules 130a, 130b, an input module 185, a coordination module 110, a signal generation module 125, a test module 120, and a battery signal module 135. Also shown are a battery backup module 155, and a plurality of EPOW modules 140.

Although the system 100 is depicted with two storage devices 150a, 150b, one controller module 145, two power supply modules 130a, 130b, one input module 185, one coordination module 110, one signal generation module 125, one test module 120, one battery signal module 135, one battery backup module 155, and two EPOW modules 140, any number of storage devices 150a, 150b, controller modules 145, power supply modules 130a, 130b, input modules 185, coordination modules 110, signal generation modules 125, test modules 120, controller signal modules 115, battery signal modules 135, battery backup modules 155, and EPOW modules 140 may be employed.

The storage devices 150a, 150b store and retrieve data. In one embodiment, the storage devices 150a, 150b are hard disk drives of a RAID system. The controller module 145 communicates with and controls the storage devices 150a, 150b through a communication channel 190a, 190b. In a certain embodiment, the communication channel 190a, 190b is a Fibre Channel Arbitrated Loop. For example, the controller module 145 may communicate data to a first storage device 150a through the communication channel 190a, 190b and the first storage device 150a stores the communicated data responsive to a controller module 145 command.

The power supply modules 130a, 130b supply power to the storage devices 150a, 150b. In one embodiment, the power supply modules 130a, 130b convert alternating current ("AC") power from the power grid to direct current ("DC") power, supplying the DC power to the storage devices 150a, 150b through a power boundary 160. In a certain embodiment, the storage devices 150a, 150b are sufficiently powered if at least one power supply module 130a, 130b supplies power through the power boundary 160. In one embodiment, the power supply modules 130a, 130b also supply power to the coordination module 110, the controller signal module 115, the test module 120, the signal generation module 125, the input module 185, and the battery signal module 135.

The coordination module 110 generates a power status signal for each of the power supply modules 130a, 130b. Each power status signal may be asserted if the power supply module 130a, 130b is supplying power. The input module 185 receives a source signal. The source signal may indicate a subsequent state change for one or more conditions of the system 100 or related devices. For example, the source signal may indicate the failure of the power grid.

The signal generation module 125 generates a plurality of output signals 165a, 165b from the source signal and one or more power status signals. In one embodiment, the output signals 165a, 165b precede the loss of power to a power boundary 160 by five milliseconds (5 ms). In addition, the signal generation module 125 generates at least one power status signal. The signal generation module 125, the input module 185, and the coordination module 110 are each comprised of one or more devices such as semiconductor devices or discrete electronic devices. A malfunction of a single signal generation module 125, input module 185, or coordination module 110 device results in the failure of no more than one output signal 165a, 165b.

For example, if a device such as a device performing an AND function in cooperation with other devices fails, the signal generation module 125 may malfunction, generating an erroneously asserted output signal 165a, 165b. The malfunctioning signal generation module 125 generates at most one erroneous output signal, such as the first output signal 165a or the second output signal 165b. The first and the second output signals 165a, 165b are not both erroneously asserted.

Each EPOW module 140 receives an output signal 165a, 165b and generates one or more EPOW signals 175 from the signal generation module output signal 165a, 165b. In one embodiment, the EPOW signals 175 conform to a specification for Fibre Channel Arbitrated Loop device backplanes, such as the SFF-8045 specification section 6.4.8.2 Power Failure Warning published by the American National Standards Institute of Washington, D.C. In the depicted embodiment, the EPOW signals 175 are used to create input signals to the storage devices 150a, 150b per SFF-8045 section 6.4.8.2. The input signals direct the storage devices 150a, 150b to take action prior to a power failure.

For example, in devices such as the storage devices 150a, 150b that are in compliance with SFF-8045 section 6.4.8.2, each EPOW signal 175 may be used to direct the storage device 150a, 150b to complete the actions required to preserve the integrity of write data for transfers in progress from a write buffer to a storage media device such as a hard disk. Fibre Channel Arbitrated Loop hard disk drives with write caching disabled per SFF-8045 section 6.4.8.2, are required to disable their Fibre Channel ports gracefully at a Fibre Channel frame boundary and stop writing data to the non-volatile storage media at a data sector boundary. Each EPOW signal 175 may also direct the storage device 150a, 150b to go off-line and not accept data for storage or requests to retrieve data. In an alternate embodiment, each storage device 150a, 150b may receive each output signal directly.

The test module 120 may generate the output signals 165a, 165b in response to the assertion of one or more test signals. In addition, the test module 120 may generate other signals in response to the test signals. For example, the assertion of one or more test signals may direct the test module 120 to assert the output signals 165a, 165b although the source signal is not asserted.

In one embodiment, the controller signal module 115 generates a controller signal 170. The controller signal 170 notifies the controller module 145 of a change in the state of the system 100, such as a change in the storage devices 150a, 150b. In a certain embodiment, the controller signal 170 indicates an imminent change in the state of the storage device 150a, 150b.

The battery signal module 135 generates a battery signal 180. In one embodiment, the battery signal 180 notifies the battery backup module 155 of a change in the state of the power grid supplying the system 100. The battery backup module 155 may prepare to supply power to one or more elements of the system 100 in response to the battery signal 180. The system 100 generates redundant output signals 165a, 165b and limits the effects of failures resulting from a redundant output signal 165a, 165b malfunction.

Figure 2:
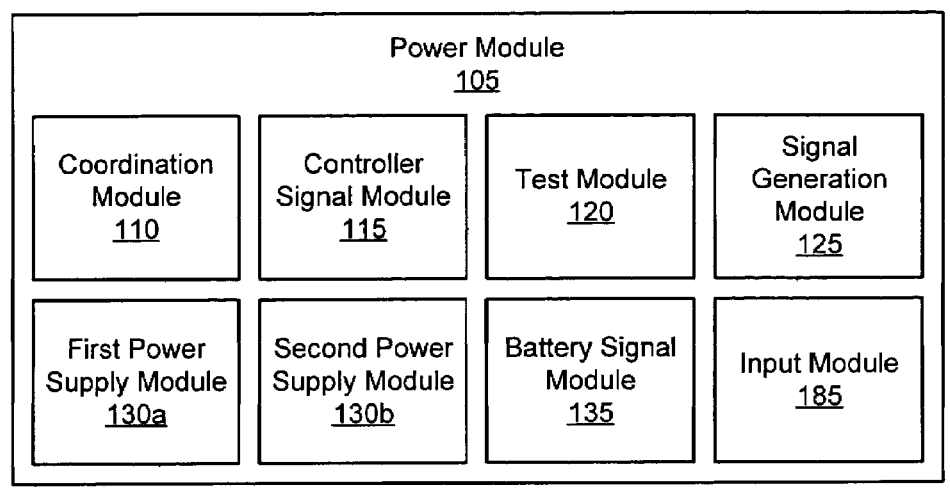
FIG. 2 is a schematic block diagram illustrating one embodiment of a redundant signal generation apparatus of the present invention.

FIG. 2 is a schematic block diagram illustrating one embodiment of a power module 105 used for redundant signal generation. The power module 105 includes a plurality of power supply modules 130a, 130b, an input module 185, a coordination module 110, a signal generation module 125, a controller signal module 115, a test module 120, and a battery signal module 135.

In one embodiment, the signal generation module 125, the input module 185, the coordination module 110, the test module 120, and the controller signal module 115 are fabricated of a plurality of discrete, redundant solid-state electronic devices such as discrete transistors and the like. In an alternate embodiment, the signal generation module 125, the input module 185, the coordination module 110, the test module 120, and the controller signal module 115 are fabricated of semiconductor gate devices on a substrate.

Referring to FIGS. 1 and 2, the coordination module 110 generates a power status signal for each of a plurality of power supply modules 130a, 130b. The power supply modules 130a, 130b supply power to one or more system elements, such as storage devices 150a, 150b, controller modules 145 and the like. The power status signal for a power supply module 130a, 130b may be asserted if the power supply module 130a, 130b is supplying power. The input module 185 receives a source signal. The signal generation module 125 generates a plurality of output signals 165a, 165b from the source signal and at least one power status signals.

The signal generation module 125 does not assert the output signals 165a, 165b if at least one power status signal is asserted and if the source signal is not asserted. For example, if at least one power status signal is asserted indicating that at least one power supply module 130a, 130b is supplying power, and if the source signal is not asserted, indicating no imminent power grid failure, the signal generation module 125 does not assert the output signals 165a, 165b.

The devices comprising the coordination module 110, the input module 185, and the signal generation module 125 are configured such that the failure of any one device will result in no more than one erroneous output signal 165a, 165b. For example, the malfunction of one signal generation module 125 may result in a failure causing one output signal 165a, 165b to be erroneously asserted. The erroneous output signal 165a, 165b may cause the component receiving the erroneous output signal 165a, 165b such as a storage device 150a, 150b to take action in anticipation of a power failure, resulting in the storage device 150a, 150b going off-line. The effects of the malfunction are limited to the single storage device 150a, 150b. Thus, in a RAID system with data stored redundantly on a plurality of storage devices 150a, 150b, for example, one storage device 150a, 150b may erroneously go off-line, but the RAID system will have sufficient functioning storage devices 150a, 150b to maintain access to all of the RAID system's data. The apparatus 105 limits the malfunction of a single device to the failure of a single output signal 165a, 165b.

Figure 3:
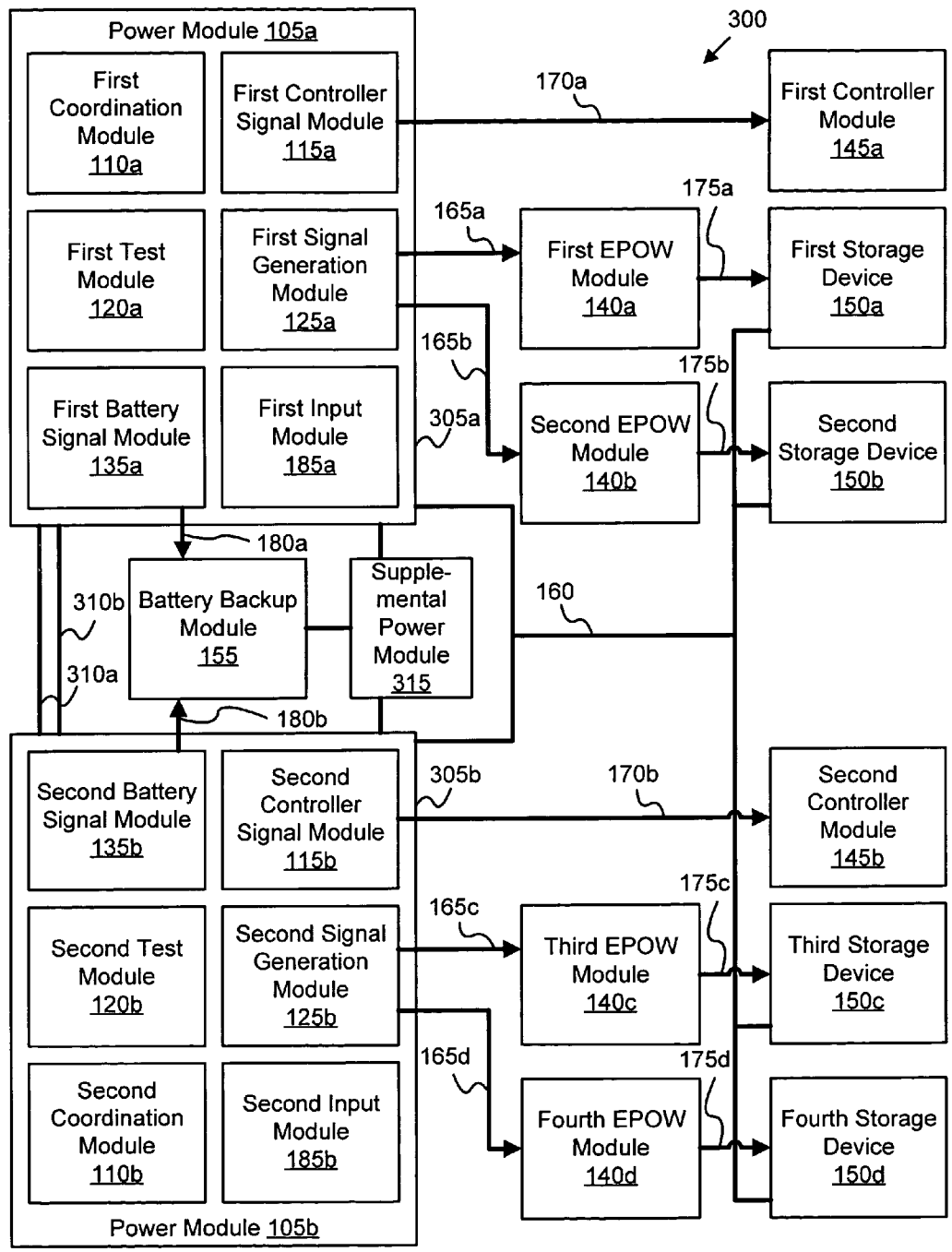
FIG. 3 is a schematic block diagram illustrating one embodiment of a dual power module redundant signal generation system of the present invention.

FIG. 3 is a schematic block diagram illustrating one embodiment of a dual power module redundant signal generation system 300 of the present invention. The system 300 includes two power modules 105 each comprising a coordination module 110, a controller signal module 115, a test module 120, a signal generation module 125, a battery signal module 135, and an input module 185. Although the system is depicted with two power modules 105, any number of power modules 105 may be employed.

The power modules 105 supply power to a plurality of storage devices 150a, 150b through a power boundary 160. The first power module 105a and the second power module 105b may each supply sufficient power for the storage devices 150. Each coordination module 110 generates a power status signal 310 for each power module 105. Thus the first coordination module 110a generates a first power status signal 310a for the first power module 105a and communicates the first power status signal 310a to the second power module 105b. Similarly, the second coordination module 110b generates a second power status signal 310b and communicates the second power status signal 310b to the first power module 105a.

The first and second input modules 185a, 185b each receive a source signal. The first signal generation module 125a generates a plurality of output signals 165a, 165b from the source signal and the second power status signal 310b while the second signal generation module 125b generates a plurality of output signals 165c, 165d from the source signal and the first power status signal 310a. Although each signal generation module 125 is depicted as generating two output signals 165, any number of output signals 165 may be generated.

The input module 185, coordination module 110, signal generation module 125, controller signal module 115, battery signal module 135, and test module 120 of each power module 105 may receive power from a supplemental power module 315. In one embodiment, the battery backup module 155 supplies power to the supplemental power module 315. The system 300 generates redundant output signals 165 from a plurality of power modules 105 that may be replaceable components.

Figure 4:
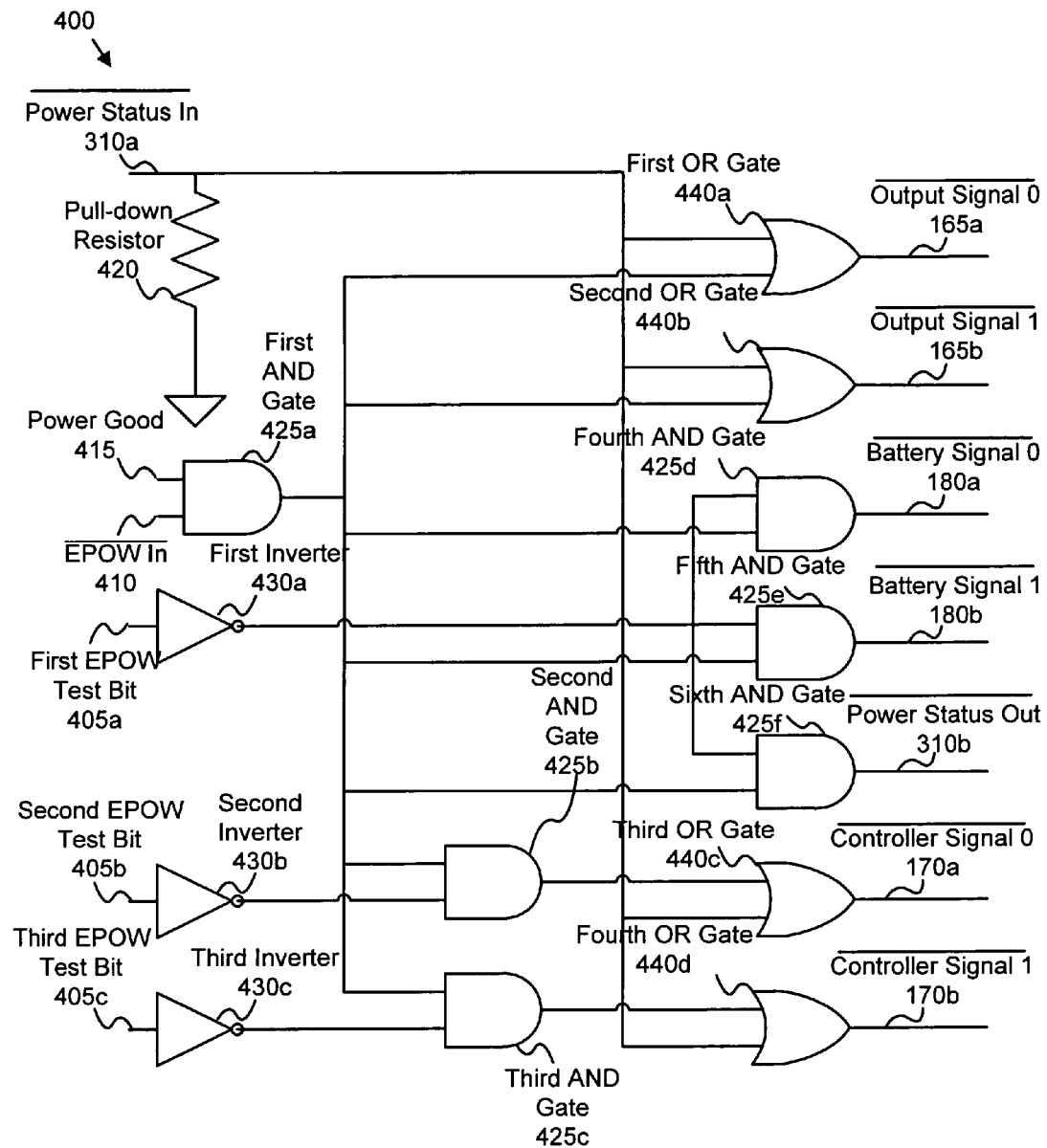
FIG. 4 is a circuit diagram illustrating one embodiment of a redundant signal generation circuit of the present invention.

FIG. 4 is a circuit diagram illustrating one embodiment of a redundant signal generation circuit 400 of the present invention. The circuit 400 is one embodiment of a power module 105 of FIGS. 1-3. The circuit 400 is, in one embodiment, connected with the coordination module 110, a controller signal module 115, a test module 120, a signal generation module 125, a battery signal module 135, and an input module 185 of FIGS. 1-3.

The circuit 400 includes devices configured as AND gates 425a, 425b, 425c, 425d, 425e, 425f OR gates 440a, 440b, 440c, 440d and inverters 430a,b,c performing logical function on digital signals as is well known to those skilled in the art. Although for simplicity the output of each AND gate 425a,b,c,d,e,f OR gate 440a,b,c,d and inverter 430a,b,c may be depicted as generating an output common to a plurality of inputs from a common set of devices such as transistors or semiconductor gates, the output of each AND gate 425a,b, c,d,e,f, OR gate 440a,b,c,d and inverter 430a,b,c represents a unique output for each input with each output generated from a set of devices unique to the output.

For example, a first AND gate 425a receives a power good signal 415 and an EPOW in signal 410. The power good signal 415 may indicate that a power supply module 130 is functioning. The EPOW in signal 410 may be the source signal as described in FIGS. 1-3 and indicate a power grid failure when asserted. The first AND gate 425a may serve as the input module 185 of FIGS. 1-3.

The first AND gate 425a performs a plurality of logical AND operations on the power good signal 415 and the EPOW in signal 410 using a unique set of devices each generating a distinct output signal for each of the inputs the first AND gate 425a drives. As depicted, the first AND gate 425a performs the AND function using seven unique sets of devices and generates seven distinct output signals, one each for a first OR gate 440a, a second OR gate 440b, a second AND gate 425b, a third AND gate 425c, a fourth AND gate 425d, a fifth AND gate 425e, and a sixth AND gate 425f.

In the depicted embodiment, the power status in signal 310a may be received from a plurality of coordination modules 110. The pull down resistor 420 allows the power status in signal 310a to be asserted should a second power supply module 130b be absent. The first and second OR gate 440a, 440b assert a first and second output signal 165a, 165b if the coordination module 110 asserts a power status signal 310 and the First And Gate 425a output is low due to either the Power Good signal 415 being de-asserted or if the EPOW In signal 410 is asserted. The first and second OR gate 440a, 440b may comprise the signal generation module 125 described in FIGS. 1-3. In one embodiment, the output signals 165 are used combinatorially with additional static logic to complete the requirements of the ANSI fiber channel specification SFF-8045 section 6.4.8 Dev_Ctrl_Code Function and section 6.4.8.2 Power Failure Warning.

The fourth and fifth AND gate 425d, 425e assert a first and second battery signals 180a, 180b if: 1) the first EPOW test bit 405a is asserted; or 2) the power good signal 415 is not asserted; or 3) the EPOW in signal 410 is asserted. Although the battery signals 180 are depicted as comprising the battery signal zero (0) 180a and the battery signal one (1) 180b, the battery signals 180 may comprise any number of signals. The fourth and fifth AND gate 425d, 425e may comprise the battery signal module 135 described in FIGS. 1-3.

A third OR gate 440c asserts a controller signal zero (0) 170a if: 1) the coordination module 110 asserts a power status signal 310a and the second EPOW test bit 405b is asserted; or 2) if the power good signal 415 is not asserted; or 3) the EPOW in signal 410 is asserted. A fourth OR gate 440d asserts a controller signal one (1) 170b if: 1) the coordination module 110 asserts a power status signal 310a and the third EPOW test bit 405c is asserted; or 2) the power good signal 415 is not asserted; or 3) the EPOW in signal 410 is asserted. Although two controller signals 170a, 170b are depicted, any number of controller signals 170 may be employed. The third and fourth OR gates 440c, 440d may comprise the controller signal module 115 described in FIGS. 1-3.

The sixth AND gate 425f asserts a power status out signal 310b if: 1) the first EPOW test bit 405a is asserted; or 2) the power good signal 415 is not asserted; or 3) the EPOW in signal 410 is asserted. The sixth AND gate 425f may comprise the coordination module 110 as described in FIGS. 1-3. The circuit 400 generates redundant output signals 165a,b and other control signals including battery signals 180a,b, a power status out signal 310b, and controller signals 170a,b.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. For example, the method may occur in parallel or in an alternate order.

Figure 5:
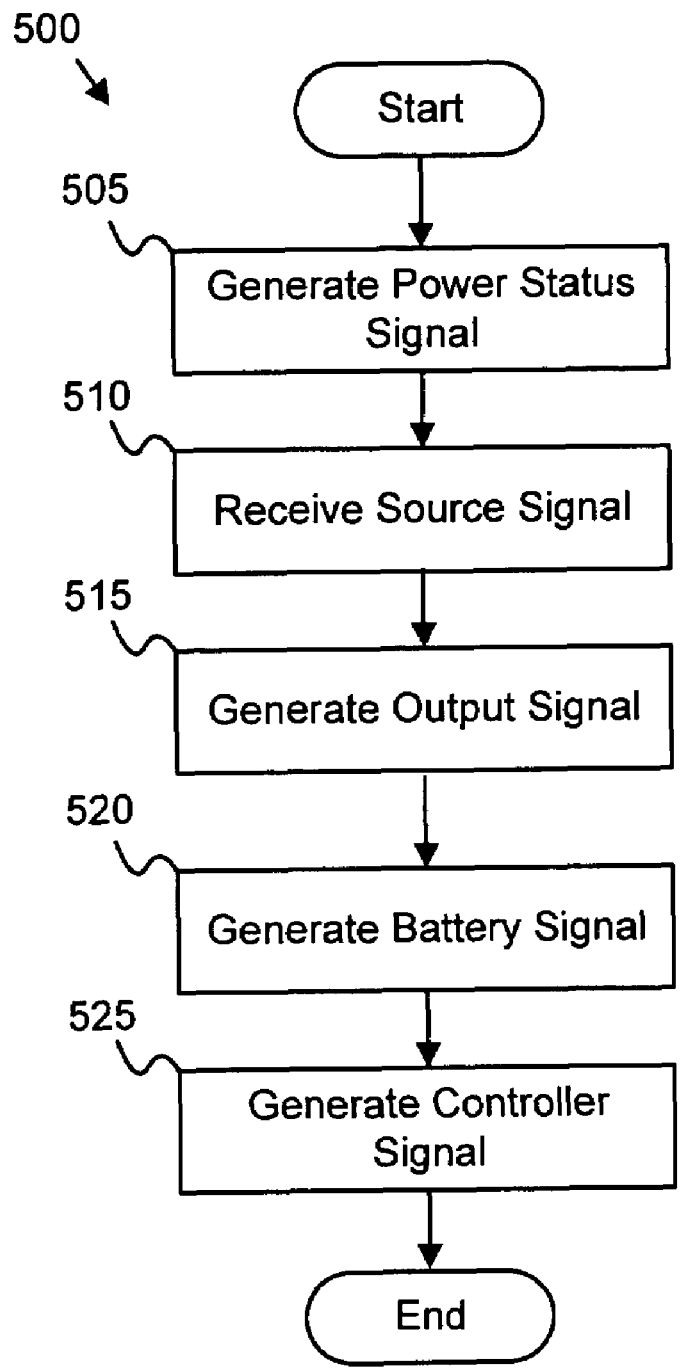
FIG. 5 is a schematic flow chart diagram illustrating one embodiment of a redundant signal generation method in accordance with the present invention.

FIG. 5 is a schematic flow chart diagram illustrating one embodiment of a redundant signal generation method 500 in accordance with the present invention. Under the method 500, a coordination module 110 (of FIGS. 1-4) generates 505 a power status signal 310a,b (of FIG. 3) for each of a plurality of power supply modules 130 (of FIGS. 1-4). An input module 185 (of FIGS. 1-4) receives 510 a source signal such as an EPOW signal 410 (of FIG. 4). In one embodiment, the EPOW in signal 410 indicates that a power grid has failed and that the failure of the power supply modules 130 (of FIGS. 1-4) is imminent.

A signal generation module 125 (of FIGS. 1-4) generates 515 a plurality of output signals 165 (of FIGS. 1-4) from the source signal and the plurality of power status signals 310a,b (of FIGS. 3-4). In one embodiment, a plurality of EPOW modules 140 (of FIGS. 1-4) generates one or more EPOW signals 175 (of FIGS. 1-4) from each output signal 165 (of FIGS. 1-4). In an alternate embodiment, each output signal 165 (of FIGS. 1-4) functions as an EPOW signal 175a,b (of FIGS. 1-4) for a storage device 150a,b (of FIGS. 1-4).

In one embodiment, a battery signal module 135 (of FIGS. 1-4) generates 520 a battery signal 180. The battery signal 180 (of FIGS. 1-4) may direct a battery backup module 155 (of FIGS. 1-4) to supply power. In addition, a controller signal module 115 (of FIGS. 1-4) may generate 525 a controller signal 170 (of FIGS. 1-4). The controller signal 170 (of FIGS. 1-4) may indicate an imminent state change such as the state change of one or more storage devices 150*a,b* (of FIGS. 1-4) to a controller module 145 (of FIGS. 1-4).

Figure 6:
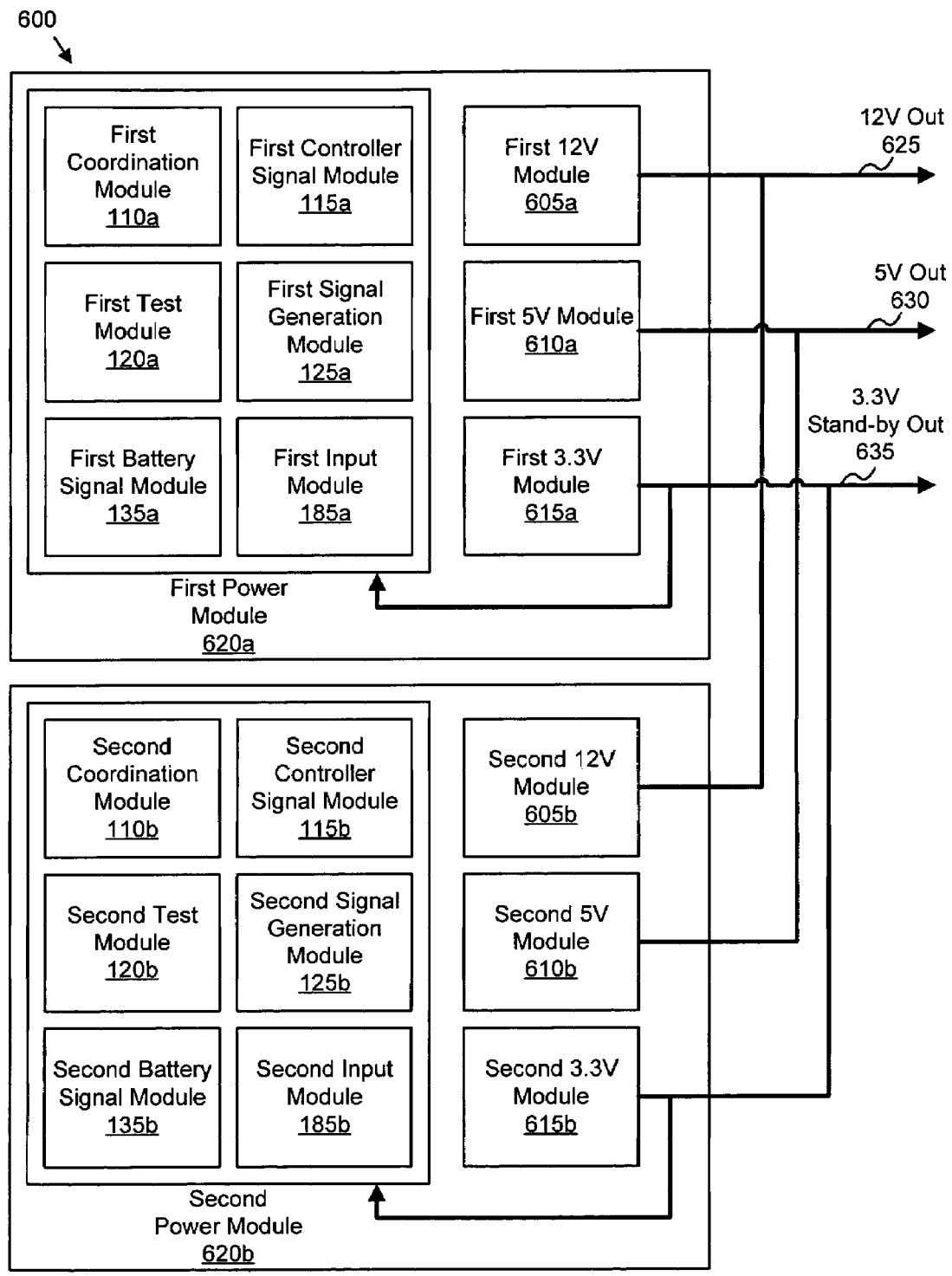
FIG. 6 is a schematic block diagram illustrating one embodiment of a system of a plurality of power modules of the present invention.

FIG. 6 is a schematic block diagram illustrating one embodiment of a power module system 600 of the present invention. The system 600 includes a first and second power module 620*a,b*. Each power module 620 includes a twelve volt (12V) module 605, a five volt (5V) module 610*a,b* and a three point three volt (3.3V) module 615*a,b*. FIG. 6 is given by way of example, and while each power module 620*a,b* is depicted with one twelve volt (12V) module 605*a,b*, one five volt (5V) module 610*a,b*, and one three point three volt (3.3V) module 615*a,b*, any number of modules and modules having different voltages and/or amperages may be employed.

The first and second twelve volt (12V) modules 605*a*, 605*b*, the first and second five volt (5V) modules 610*a*, 610*b*, and the first and second three point three volt (3.3V) modules 615*a*, 615*b* each supply a power boundary. For example, the twelve volt (12V) modules 605*a,b* supply a twelve volt (12V) power boundary through a twelve volt (12V) out 625, the five volt (5V) modules 610*a,b* supply a five volt (5V) power boundary through a five volt (5V) out 630, and the three point three volt (3.3V) modules 615*a,b* supply a three point three volt (3.3V) power boundary through a three point three volt (3.3V) out 635.

Each three point three volt (3.3V) module 615*a,b* may supply power to an input module 185*a,b*, a coordination module 110*a,b*, a signal generation module 125*a,b*, a controller signal module 115*a,b*, a test module 120*a,b*, and a battery signal module 135*a,b*. The three point three volt (3.3) module 615*a,b* may be the supplemental power module 315 described in FIG. 3.

In one embodiment, the three point three volt (3.3V) module 615 continues to supply power if the first and second power modules 620*a*, 620*b* do not receive power from a power grid. For example, the three point three volt (3.3V) module 615 may receive power from a battery. The battery backup module 155 as described in FIGS. 1 and 3 may comprise the battery. The input modules 185*a,b*, coordination modules 110*a,b*, signal generation modules 125*a,b*, controller signal modules 115*a,b*, test modules 120*a,b*, a battery signal modules 135*a,b* continue to function if one or more power modules 620 fail to receive power from the power grid.

The present invention reduces failures in a critical system by generating redundant output signals 165*a,b,c*, and *d* (of FIGS. 1-4). The output signals 165*a,b,c*, and *d* (of FIGS. 1-4) may be employed to warn of a state change such as a power failure and may be used to protect data. In addition, the present invention is the first to limit the effects of failures resulting from a malfunction of one device comprising the plurality of devices generating the redundant output signals 165*a,b,c*, and *d* (of FIGS. 1-4) so that no more than one output signal 165*a,b,c*, and *d* (of FIGS. 1-4) is erroneously asserted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to generate redundant signals, the apparatus comprising:

a coordination module configured to generate a power status signal for each of a plurality of power modules;

an input module configured to receive a source signal; and a signal generation module configured to generate a plurality of output signals from the source signal and at least one power status signal, wherein the output signals are not asserted if at least one power supply is operational, and wherein a single malfunction of a signal generation module device results in the failure of no more than one output signal.

2. The apparatus of claim 1, wherein the signal generation module is fabricated of plurality of discrete, redundant solid-state electronic devices.

3. The apparatus of claim 1, wherein each output signal is configured as an early power off warning signal.

4. The apparatus of claim 3, wherein the redundant output signal is configured as a Fibre Channel early power off warning signal.

5. The apparatus of claim 4, wherein the signal generation module communicates with a plurality of early power off warning modules configured to generate a plurality of Fibre Channel early power off warning signals from each output signal.

6. The apparatus of claim 1, further comprising a test module configured to verify the functionality of the signal generation module.

7. The apparatus of claim 1, further comprising a battery signal module configured to generate a battery signal configured to activate a battery backup module.

8. The apparatus of claim 1, further comprising a controller signal module configured to generate a controller signal configured to notify a controller module of a change in a storage device state.

9. The apparatus of claim 1, further comprising a plurality of input modules, a plurality of coordination modules, and a plurality of signal generation modules each powered by a supplemental power module.

10. An apparatus to generate redundant signals, the apparatus comprising:

a plurality of power sensors configured to detect an active power line;

an input module configured to receive a source signal;

a signal generation module configured to generate a plurality of output signals from the source signal and at least one detected active power line, wherein the output signals are not asserted if at least one power line is operational, and wherein a single malfunction of a signal generation module device results in the failure of no more than one output signal.

11. A system to generate redundant signals, the system comprising:

a plurality of storage devices;

a controller module configured to control the storage devices;

a plurality of power modules configured to power the storage devices;

an input module configured to receive a source signal;

a coordination module configured to generate a power status signal for each power module; and a signal generation module configured to generate a plurality of output signals from the source signal and at least one power status signal, wherein each output signal is in communication with one storage device, the output signals are not asserted if at least one power supply is operational, and wherein a single malfunction of a signal generation module device results in the failure of no more than one output signal.

12. The system of claim 11, wherein the signal generation module is fabricated of a plurality of discrete, redundant solid-state electronic devices.

13. The system of claim 11, wherein each output signal is configured as an early power off warning signal.

14. The system of claim 13, wherein each output signal is configured as a Fibre Channel early power off warning signal.

15. The system of claim 14, further comprising a plurality of early power off warning modules configured to generate a plurality of Fibre Channel early power off warning signals from each output signal.

16. The system of claim 11, further comprising a plurality of input modules, a plurality of coordination modules, and a plurality of signal generation modules each powered by a supplemental power module.

17. The system of claim 11, further comprising a test module configured to verify the functionality of the signal generation module.

18. The system of claim 11, further comprising a battery signal module configured to generate a battery signal configured to activate a battery backup module.

19. The system of claim 11, further comprising a controller signal module configured to generate a controller signal configured to notify the controller module of a change in the storage device state.

20. A method for generating redundant signals, the method comprising:
    generating a power status signal for each of a plurality of power modules;
    receiving a source signal; and
    generating a plurality of output signals from the source signal and at least one power status signal, wherein the output signals are not asserted if at least one power supply is operational, and wherein a single malfunction of a signal generation module device results in the failure of no more than one output signal.

21. The method of claim 20, wherein the output signals are generated by a plurality of discrete, redundant solid-state electronic devices.

22. The method of claim 20, wherein each output signal is configured as an early power off warning signal.

23. The method of claim 22, further comprising generating a plurality of Fibre Channel early power off warning signals from each output signal.

24. The method of claim 20, further comprising verifying the functionality of the power status signal generation means, the source signal receiving means, and the output signal generation means.

25. The method of claim 20, further comprising generating a battery signal configured to activate a battery backup module.

26. The method of claim 20, further comprising generating a controller signal configured to notify a controller module of a change in a storage device state.

27. The method of claim 20, further comprising providing a supplemental power source for the power status signal generation means, the source signal receiving means, and the output signal generation means.

28. A method for generating redundant signals, the method comprising:
    controlling a plurality of storage devices;
    generating a power status signal for each of a plurality of power modules configured to power the storage devices;
    receiving a source signal; and
    generating a plurality of output signals from the source signal and at least one power status signal, wherein the output signals are not asserted if at least one power supply is operational, and wherein a single malfunction of a signal generation module device results in the failure of no more than one output signal.

29. The method of claim 28, wherein the output signals are generated by a plurality of discrete, redundant solid-state electronic devices.

30. An apparatus to generate redundant signals, the apparatus comprising:
    means for generating a power status signal for each of a plurality of power modules;
    means for receiving a source signal;
    means for generating a plurality of output signals from the source signal and at least one power status signal, wherein the output signals are not asserted if one power supply is operational, and wherein a malfunction of a signal generation module device results in the failure of no more than one output signal.

* * * * *